United States Patent [19]

Parker et al.

[11] 4,027,788

[45] June 7, 1977

[54] SPREADER FOR FERTILIZER, SEED AND THE LIKE

[75] Inventors: Richard W. Parker; Arthur L. Kaeser, both of Springfield, Ohio

[73] Assignee: Parker Sweeper Company, Springfield, Ohio

[22] Filed: Mar. 15, 1976

[21] Appl. No.: 666,667

[52] U.S. Cl. .............................. 222/614; 222/486; 280/415 R

[51] Int. Cl.² ...................................... A01C 15/00

[58] Field of Search .......... 222/239, 177, 178, 238, 222/235, 273, 274, 311, 486; 280/415 R

[56] References Cited

UNITED STATES PATENTS

| | | | |
|---|---|---|---|
| 2,541,008 | 2/1951 | Stahmer et al. | 222/177 |
| 2,569,421 | 9/1951 | Larson | 222/177 |
| 2,723,053 | 11/1955 | Gandrud | 222/177 |
| 2,916,189 | 12/1959 | Christenson | 222/177 X |

*Primary Examiner*—Stanley H. Tollberg
*Assistant Examiner*—Hadd Lane
*Attorney, Agent, or Firm*—Jacox & Meckstroth

[57] ABSTRACT

A lawn spreader includes an elongated generally rectangular hopper supported by a set of wheels and having a bottom member formed by a longitudinally extending aluminum extrusion. The extrusion has upwardly projecting inclined flange portions which are secured to the inclined side walls of the hopper, and the flange portions are integrally connected by a lower portion defining a longitudinally extending guideway. A slide member is supported within the guideway and is also formed from an aluminum extrusion. The slide member includes a longitudinally extending integral rib which projects downwardly and connects directly with the lower end portion of a control lever pivotally supported by a side wall of the hopper. The upper end portion of the lever engages a rotatably adjustable cam for precisely positioning the slide member to regulate accurately the discharge of material from the hopper through a set of spaced apertures within the extrusions. A push-type handle member projects upwardly from the hopper, and means are provided for converting the handle member into a tow bar adapted to be pulled by a motor vehicle such as a garden tractor.

21 Claims, 6 Drawing Figures

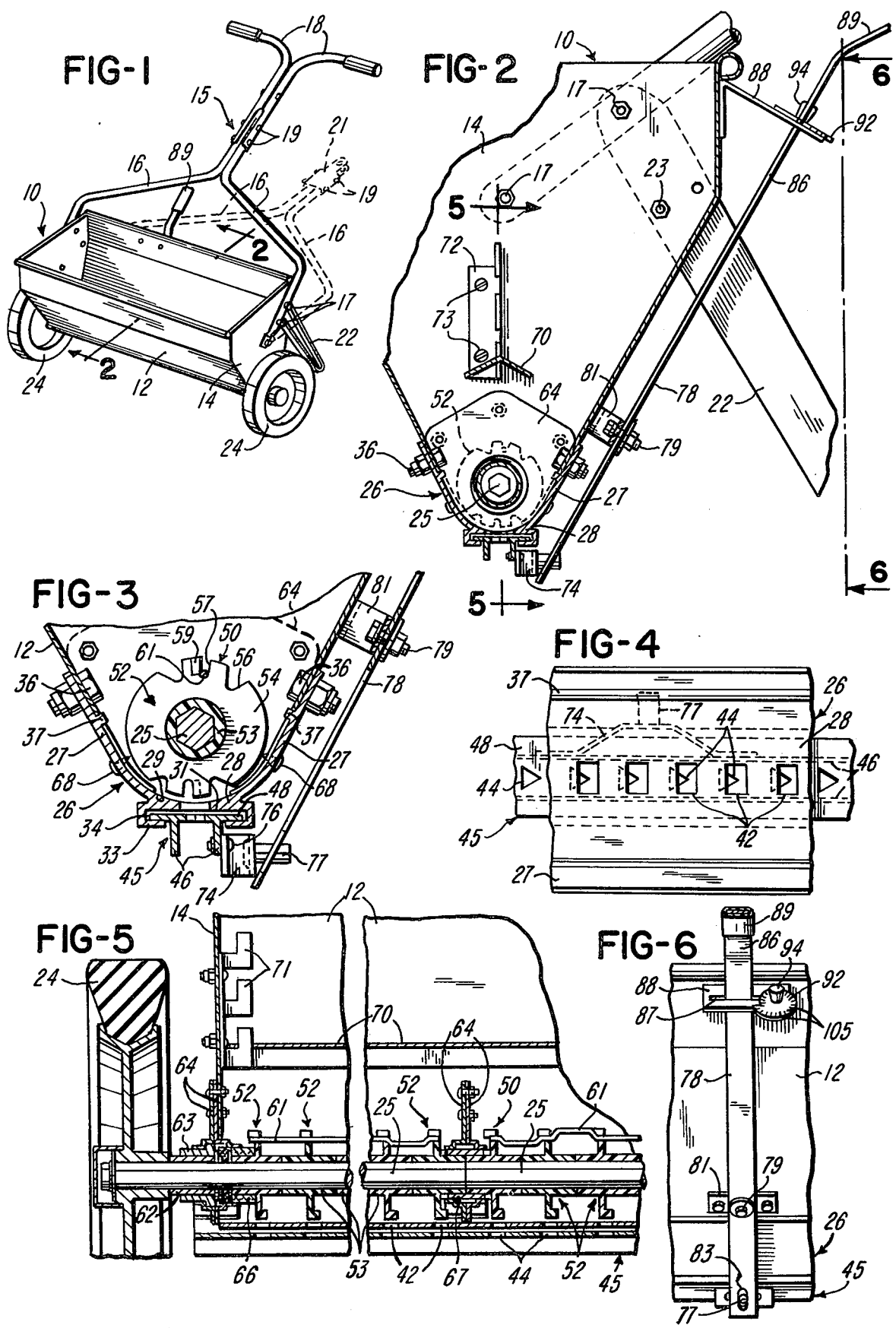

SPREADER FOR FERTILIZER, SEED AND THE LIKE

BACKGROUND OF THE INVENTION

Various forms of spreaders have been either constructed or proposed for uniformly distributing granular or powder materials such as fertilizers and seeds over the ground. For example, U.S. Pats. No. 2,678,145, No. 2,761,589, No. 2,817,460, No. 2,839,222, No. 3,002,656, No. 3,015,416 and No. 3,180,530 each discloses a spreader of the push-type which is commonly used for fertilizing and seeding a lawn. Other forms of spreaders are constructed for towing over a lawn or field behind a motor driven vehicle. These types of spreaders are disclosed, for example, in U.S. Pats. No. 2,634,029, No. 2,835,420, No. 2,916,189, and No. 3,425,599.

The spreaders usually include a wheel supported hopper constructed of sheet steel which is either formed or deep drawn to form a part cylindrical bottom portion for the hopper, for example, as shown in above U.S. Pats. No. 2,678,145, No. 2,817,460 and No. 2,835,420. A series of longitudinally spaced openings or apertures are formed within the curved bottom wall or portion of the hopper, and a corresponding set of openings or apertures are formed within a curved sheet metal slide member which is supported directly below the curved bottom portion of the hopper for either longitudinally sliding movement or circumferential movement. Various mechanisms have also been proposed for adjusting the slide member, but the mechanisms commonly do not provide for precise adjustment.

The sheet metal hopper and slide member are usually painted prior to assembly. However, it is difficult to obtain a paint coating which provides substantial resistance to either abrasion or chemical corrosion by granulated fertilizer. The problems of corrosion and abrasion are particularly more pronounced on the curved bottom portion of the hopper below the rotary agitator and on the adjustable slide member. As a result, it is sometimes desirable to remove the slide member after using the spreader so that the hopper and slide member can be flushed and cleaned before the spreader is placed in storage. It is also not uncommon for fine solid fertilizer particles or seeds to lodge between the sheet metal bottom member and the sheet metal slide member and to bind the slide member so that it is difficult to adjust the slide member precisely for accurately controlling the flow of material through the apertures.

An increase in corrosion resistance has been obtained by forming the hopper and the slide member from a thin stainless steel sheet material. However, it is difficult to provide the bottom portion of the hopper and the slide member with sufficient rigidity to prevent lodging of some of the fine hard granular materials between the bottom portion of the hopper and the slide member so that the slide member can be easily adjusted. In addition, the sheet metal bottom portion of the hopper is easily dented by a stone or tree stump, resulting in binding of the slide member.

SUMMARY OF THE INVENTION

The present invention is directed to an improved spreader for distributing a flowable material and which provides for a significant increase in the corrosion resistance of the hopper bottom portion and the adjustable slide member. In addition, the hopper bottom portion and the slide member are provided with surfaces which substantially eliminate the problem of binding of the slide member and enable the slide member to be easily positioned or adjusted between its open and closed positions. The slide member also cooperates with a simplified control or adjustment mechanism for precisely positioning the slide member so that the discharge of material may be more accurately controlled.

In accordance with a preferred embodiment of the invention, the bottom portion of the hopper and the slide member are formed of aluminum extrusions. The spreader embodiment also incorporates an improved agitator assembly formed by a plurality of molded plastic agitating elements mounted on two aligned shaft sections which extend to form the axles for the supporting wheels. The simplified control mechanism for adjusting the slide member, provides for precisely positioning of the slide member relative to the hopper, and the push-type handle member is adapted to be conveniently converted to a tow bar.

Other features and advantages of the invention will be apparent from the following description, the accompanying drawing and the appended claims.

DESCRIPTION OF THE DRAWING

FIG. 1 is a perspective view of a lawn spreader constructed in accordance with the invention;

FIG. 2 is a fragmentary vertical section of the lawn spreader and taken generally on the line 2—2 of FIG. 1;

FIG. 3 is an enlarged vertical section of the lower portion of the spreader shown in FIG. 2;

FIG. 4 is a fragmentary plan view of the hopper bottom member and the underlying slide member, shown in FIG. 3;

FIG. 5 is a fragmentary section of a portion of the lawn spreader shown in FIG. 1 and taken generally on the line 5—5 of FIG. 2; and FIG. 6 is a fragmentary rear elevational view of the lawn spreader, taken generally on the line 6—6 of FIG. 2, and showing the slide member adjusting or control mechanism.

DESCRIPTION OF THE PREFERRED EMBODIMENT

Referring to FIG. 1, a lawn spreader constructed in accordance with the invention, includes an elongated rectangular hopper 10 having a pair of opposing side walls 12 formed of sheet metal and rigidly connecting a pair of vertical end walls 14. A push-type handle member 15 slopes upwardly from the hopper 10 and includes a set of formed tubular base portions 16 which have lower ends secured to the end walls 14 of the hopper 10 by a set of bolts 17 (FIG. 2). A pair of tubular handle grip members 18 are secured to the upper ends of the base portions 16 by a set of cross bolts 19. When it is desired to tow the spreader, for example, behind a garden tractor, the base portions 16 are pivoted to a generally horizontal position, as shown by the dotted lines in FIG. 1, after the rear set of bolts 17 are removed. The grip members 18 are removed and replaced by a clevis 21 which is also secured by the bolts 19.

A pair of formed sheet metal leg members 22 are also secured to the end walls 14 by the rear set of bolts 17 and another set of bolts 23. When the handle member 15 is converted to a tow bar, the leg members 22 are removed, and rear set of bolts 17 replace the bolts 23 for securing the base portions 16 in the generally horizontal position. A set of rubber tire wheels 24 support the bottom portion of the hopper 10 and are mounted on the corresponding end portions of two aligned hexagonal axles or shafts 25 (FIG. 5) which extend longitudinally through the lower portion of the hopper 10.

The hopper includes an elongated extruded bottom member 26 which extends between the wheels 24 and is formed from an aluminum extrusion anodized to provide a hard corrosion resistant surface. The bottom member 26 includes a set of longitudinally extending flange portions 27 which project upwardly at acute angles from a connecting integral lower portion 28. The lower portion 28 has a part cylindrical or curved upper surface 29 and a flat bottom surface 31. The lower portion 28 also includes a set of longitudinally extending and opposing L-shaped flanges 33 having inner surfaces which cooperate with the flat bottom surface 31 to define a longitudinally extending guideway 34.

Each of the upwardly projecting flange portions 26 is secured to the corresponding side wall 12 of the hopper 10 by a series of longitudinally spaced rivets or bolts 36. Each flange 26 also includes a longitudinally extending integral rib 37 which forms an inwardly projecting shoulder for receiving the lower edge portion of the corresponding side wall 12. The set of bolts 36 and the engagement of the side walls 12 with the corresponding ribs 37 to provide a positive and rigid connection of the bottom member 26 to the lower edge portions of the hopper 10. In addition, the extruded aluminum bottom member 26 provides the bottom portion of the hopper 10 with substantial rigidity so that the bottom portion of the hopper is capable of withstanding a substantial impact caused, for example, by hitting a rock or tree stump.

A series of longitudinally spaced rectangular holes or apertures 42 (FIGS. 3 and 4) are formed within the lower portion 28 of the bottom member 26 and extend from the curved surface 29 to the flat surface 31. The apertures 42 cooperate with a corresponding set of uniformly spaced triangular openings or apertures 44 spaced longitudinally within an elongated extruded slide member 45 which is also formed from an aluminum extrusion having an anodized surface. The slide member 45 includes a set of longitudinally extending parallel rib portions 46 which are integrally connected by a flat head or top portion 48. The opposite edges of the top portion 48 project outwardly from the rib portions 46 and into the opposing grooves defined by the flanges 33 and the bottom surface 31 of the bottom member 26. The flat upper surface of the top portion 48 of the slide member 45 extends parallel to the bottom surface 21 of the bottom member 25, with a slight clearance so that the slide member 45 is free to move longitudinally within the guideway 34.

As shown in FIGS. 3 and 5, an agitator assembly 50 is positioned directly above the bottom member 26 of the hopper 10 and includes a plurality of agitating elements 52 each of which is molded from a plastics material such as nylon. Each of the agitating elements 52 includes a cylindrical hub portion 53 having a hexagonal bore for receiving the corresponding shaft 25. A generally circular annular disc portion 54 projects outwardly from the hub portion 53 and includes a set of peripherally spaced notches 56 along with a pair of diametrically opposed slots 57. Each disc portion 54 also includes a set of diametrically opposed wings 59 which extend angularly relative to a radial plane positioned parallel to the disc portion 54. All of the agitating elements 52 mounted on each of the shafts 25 receive a longitudinally extending rigid wire or rod element 61 which snaps-fit into the lower portions of the correspondingly aligned slots 57 within the agitating elements 52. The rod elements 61 function to break up any large pieces of the material within the hopper and to prevent "bridging" of the material so that material is always present at the apertures 42 for distribution.

Referring to FIG. 5, a set of tubular sleeves or bushings 62 are mounted on the outer end portions of the aligned shafts 25, outboard of the agitating elements 52, and each bushing 62 is preferably molded of a plastics material such as nylon. Each bushing 62 projects through a corresponding tubular bearing 63 mounted within a pair of adjacent bearing retaining plates 64 rigidly secured to the corresponding end wall 14 of the hopper 10. The inner retaining plate 64 confines a tubular felt seal 66 which receives the hub portion 53 of the adjacent outermost agitating element 52. The adjacent inner end portions of the aligned shafts 25 are supported for independent rotation by a tubular center bearing 67 which is mounted within another pair of bearing retaining plates 64 located at the bottom center of the hopper 10. Each of the bearing retaining plates 64 has flanges which are secured to the bottom member 26 by a pair of screws 68.

As shown in FIGS. 2 and 5, an elongated deflector member 70 extends longitudinally of the hopper 10 between the end walls 14 and has an inverted V-shaped cross-sectional configuration. A set of holes are formed within the opposite ends of the deflector member 70 for receiving a corresponding set of support hooks 71 forming part of a set of angular brackets 72 secured to the end walls 14 by bolts 73. The brackets 72 provide for adjusting the vertical position of the deflector member 70 relative to the agitator assembly 50. The deflector member 70 serves to support a portion of the load of material and remove the load from the agitator 50, and also cooperates to direct the material into opposite sides of the agitator.

A rigid metal bracket 74 (FIGS. 3 and 4) is secured to the center portion of one of the ribs 46 of the slide member 45 by a set of rivets 76 and supports a rearwardly projecting cylindrical stud 77. An adjustment lever 78 (FIGS. 3 and 6) is pivotally supported by a bolt 79 which is secured to a bracket 81 mounted on the rear side wall 12 of the hopper 10. The lower end portion of the lever 78 has a slot 83 (FIG. 6) which receives the stud 77. The lever 78 has an upper end portion 86 which projects through a slot 87 within a V-shaped bracket 88 mounted on the upper portion of the rear side wall 12.

The upper end portion 86 of the lever 78 has a handle grip 89 (FIG. 1) which provides for manually pivoting the lever 78 in a plane parallel to the rear side wall 12 of the hopper. When the lever 78 is pivoted on the bolt 79, the slide member 45 is shifted longitudinally between its fully open and closed positions. When the slide member 45 is in its closed position, the triangular openings or apertures 44 within the slide member 45 are positioned between the rectangular openings or apertures 42 within the bottom member 26 so that the apertures 42 are effectively closed by the slide member to prevent dispensing or discharge of the material within the hopper 10. When the slide member 45 is in its fully open position, the triangular apertures 44 are fully exposed within the apertures 42 within the bottom member 26 to provide for the maximum flow of material from the hopper 10 downwardly between the rib portions 46 of the slide member 45 and onto the ground surface.

Referring to FIGS. 2 and 6, a flat control cam 92 is rotatably supported by a threaded stud secured to the bracket 88, and the cam 92 is releasably secured by a knob 94 which receives the stud. The rotatable cam 92 has a spiral-like outer edge surface which forms a variable stop for limiting the movement of the lever 78.

A series of graduated marks 105 are formed on the cam 92, and when the knob 94 is released, the cam 92 may be rotated for precisely adjusting the limit of pivotal movement of the lever 78 and the position of the slide member 45. The marks 105 are calibrated to correspond to different predetermined positions of the apertures 44 within the slide member 45 relative to the apertures 42 within the bottom member 25 for precisely controlling or regulating the flow rate of material from the hopper 10.

From the drawing and the above description, it is apparent that a spreader constructed in accordance with the present invention, provides desirable features and advantages. For example, the extruded aluminum bottom member 26 for the hopper 10 and the extruded aluminum slide member 45 provide the lower portion of the hopper and the slide member with substantial rigidity. As mentioned above, this rigidity significantly helps in preventing impact damage to the bottom of the hopper and also eliminates bowing or bending of the slide member when the slide member is shifted longitudinally in response to actuation of the control lever 78 for regulating the discharge of material from the hopper 10.

In addition, the anodizing of the extrusions increase their corrosion resistance to the chemicals within the fertilizers and provides a hard surface which eliminates the embedding of solid particles into the members, thereby eliminating binding of slide member 4 within the guideway 34 of the bottom member 25. The spaced ribs 46 on the slide member 45 also serve to provide a wind baffle for fine material being distributed to assure accurate depositing of the material.

The direct connection of the control lever 78 to the slide member 45 and the relative position of the adjustment cam 92 also provide a simplified means for conveniently and precisely controlling the movement of the slide member 45 to a selected partially open position according to the desired discharge rate of material. That is, the cam 92 provides a direct stop for the lever 78 for precisely limiting movement of the slide member 45 when the lever is moved towards an open position.

Another important feature is provided by the construction of the agitating elements 52 and their mounting on the shafts 25. That is, the molded agitating elements 52 of plastics material substantially eliminate corrosion of the agitator assembly 50. In addition, the mounting of the agitating element 52 in adjacent relation on the hexagonal shafts 22 provides for protecting the plates metal shafts 25 as well as positive drive connections. It is also apparent that the slide member 45 may be easily removed from the bottom member 25 simply by removing one of the wheels 20 and moving the lower depending end portion of the lever 78 rearwardly out of engagement with the stud 77 on the slide member 45.

As a further feature, the push-type handle member 15 may be quickly converted into a tow bar, as shown in FIG. 1, so that the spreader may be conveniently adapted for pulling behind a garden tractor. The dual shafts 22 and corresponding drive wheels 24 not only provide for a differential movement but also distribute the drive for the agitator 50 to both wheels and further provides for more uniform distribution of the material when the spreader is moving along a curved path.

While the form of spreader and method of construction herein described constitutes a preferred embodiment of the invention, it is to be understood that the invention is not limited to this precise form and method, and that change may be made therein without departing from the scope and spirit of the invention as defined in the appended claims.

The invention having thus been described, the following is claimed:

1. An improved spreader for distributing a flowable material on the ground, comprising a hopper having opposite end walls connected by opposite side walls and adapted to receive the material, means supporting said hopper for ground traversing movement, means extending from said hopper to facilitate moving said hopper over the ground, said side and end walls of said hopper having lower edge portions defining a generally rectangular opening, an elongated bottom extrusion forming a bottom wall for said hopper and extending generally between said end walls for closing said opening, means for securing said bottom extrusion to said side walls of said hopper, means defining a first series of longitudinally spaced apertures within said extrusion, said bottom extrusion including an integral lower portion defining a longitudinally extending guideway, an elongated slide member supported for longitudinal movement within said guideway, means defining a second series of longitudinally spaced apertures within said slide member and cooperating with said first series of apertures to provide for a flow of material from said hopper, and means for adjustably positioning said slide member longitudinally within said guideway for controlling the flow of material through said apertures.

2. A spreader as defined as claim 1 wherein said lower portion of said extrusion includes a set of longitudinally extending opposing grooves cooperating to define said guideway, and said slide member comprises a slide extrusion having a set of longitudinally extending and outwardly projecting flange portions projecting into the corresponding said grooves.

3. A spreader as defined in claim 2 wherein said bottom extrusion includes a generally flat bottom surface cooperating to define said guideway, and said slide extrusion has a generally flat upper surface positioned adjacent said bottom surface of said bottom extrusion.

4. A spreader as defined in claim 2 wherein said slide extrusion includes at least one longitudinally extending and downwardly projecting rib portion positioned between said flange portions and formed integrally with said flange portions.

5. A spreader as defined in claim 2 wherein said slide extrusion includes a plurality of longitudinally extending and downwardly projecting generally parallel rib portions disposed between said flange portions.

6. A spreader as defined in claim 2 wherein said apertures within said bottom extrusion are rectangular, and said apertures in said slide extrusion are generally triangular.

7. A spreader as defined in claim 1 wherein said lower portion of said bottom extrusion has a part cylindrical upper surface and a substantially flat bottom surface, and a pair of flange portions project downwardly from said bottom surface to form said guide way.

8. A spreader as defined in claim 1 including an elongated rotaty shaft extending laterally between said end walls of said hopper and having a polyagonal cross-sectional configuration, a plurality of axially spaced agitating elements mounted on said shafts in adjacent relation, and each of said agitating elements comprises a body of molded plastics material.

9. A spreader as defined in claim 1 wherein said means for adjustably positioning said slide member comprises a lever having an upper handle grip portion and a lower end portion connected to said slide member, pivot means mounted on said hopper and pivotally supporting said lever between said lower end portion and said grip portion, and an adjustable stop member supported by said hopper for engaging said lever between said pivot means and said grip portion for precisely limiting the movement of said lever and the longitudinal movement of said slide member.

10. A spreader as defined in claim 9 including a bracket mounted on the upper portion of said hopper, means defining a slot within said bracket for receiving said lever, and said stop member comprises a rotatable cam supported by said bracket adjacent said slot.

11. A spreader as defined in claim 1 wherein said means extending from said hopper to facilitate moving said hopper comprise a push-type handle member inclined upwardly from said hopper, and means for converting said handle member into a generally horizontal tow bar adapted to be pulled behind a vehicle.

12. A spreader as defined in claim 1 wherein said bottom extrusion includes a set of upwardly projecting and longitudinally extending integral flange portions defining an acute angle therebetween, and said side walls are secured to corresponding said flange portions.

13. An improved spreader for distributing a flowable material on the ground, comprising an elongated hopper having opposite end walls connected by opposite side walls and adapted to receive the material, a set of wheels supporting said hopper for ground traversing movement, means extending from said hopper to facilitate moving said hopper over the ground, said side and end walls of said hopper having lower edge portions defining a generally rectangular opening, an elongated bottom extrusion forming a bottom member for said hopper and extending laterally between said end walls for closing said opening, said bottom extrusion including a set of upwardly projecting and longitudinally extending integral flange portions, means for securing said flange portions of said first extrusion to side walls of said hopper, means defining a first series of longitudinally spaced apertures within said bottom extrusion, said bottom extrusion including a lower portion integral with said flange portions and having means defining a longitudinally extending guideway, an elongated slide extrusion forming a slide member supported for longitudinal movement within said guideway, means defining a second series of longitudinally spaced apertures within said slide extrusion and cooperating with said first series of apertures to provide for a flow of material from said hopper, and means for adjustably positioning said slide extrusion longitudinally within said guideway for controlling the flow of material through said apertures.

14. A spreader as defined in claim 13 wherein said flange portions of said bottom extrusion each include a longitudinally extending and inwardly projecting integral rib, and said side walls of said hopper include lower edge portions overlapping the corresponding said flange portions of said bottom member and terminating adjacent the corresponding said ribs.

15. In a spreader for distributing a flowable material on the ground and including a hopper having opposite end walls connected by opposite side walls for receiving the material, means supporting said hopper for ground traversing movement, means extending from said hopper to facilitate moving said hopper over the ground, said hopper including a bottom portion having a first series of longitudinally spaced apertures, an elongated slide member supported for sliding movement adjacent said bottom portion of said hopper, means defining a second series of longitudinally spaced apertures within said slide member and cooperating with said first series of apertures to provide for a flow of material from said hopper, means for adjustably positioning said slide member for controlling the flow of material through said apertures, and an agitator assembly positioned within said hopper above said bottom portion, the improvement wherein said bottom portion of said hopper comprises an elongated aluminum bottom extrusion having integral flange portions connected to said side walls of said hopper, means on said bottom extrusion defining a longitudinally extending guideway, and said slide member comprises an elongated aluminum slide extrusion supported within said guideway.

16. A spreader as defined in claim 15 wherein each of said aluminum extrusions has an anodized surface to provide substantial resistance to corrosion and abrasion.

17. In a spreader for distributing a flowable material on the ground and including a hopper having opposite end walls connected by opposite side walls for receiving the material, means supporting said hopper for ground traversing movement, means extending from said hopper to facilitate moving said hopper over the ground, said hopper including a bottom portion having a series of longitudinally spaced apertures, an elongated slide member supported for sliding movement adjacent said bottom portion of said hopper, means for adjustably positioning said slide member for controlling the flow of material through said apertures, and a rotary driven agitator assembly positioned within said hopper above said bottom portion, the improvement wherein said agitator assembly comprises a plurality of agitating elements each including a hub portion and an integral disc portion of plastics material, shaft means extending through said hopper and having a polygonal cross-sectional configuration, said hub portions of said agitating elements are mounted on said shaft means in adjacent relation, at least one rod member extending parallel to said shaft means, and means forming a snap-fit connection between said rod member and said disc portion of each of said agitating elements.

18. A spreader as defined in claim 17 wherein said shaft means comprise a set of axially aligned shafts, a support bearing disposed within said hopper and having means for rotatably supporting the inner end portions of said shafts adjacent said hub portions of two of said agitating elements.

19. In a spreader for distributing a flowable material on the ground and including a hopper having opposite end walls connected by opposite side walls for receiving the material, means supporting said hopper for ground traversing movement, means extending from said hopper to facilitate moving said hopper over the ground, said hopper including a bottom portion having a series of longitudinally spaced apertures, an elongated slide member supported for sliding movement adjacent said bottom portion of said hopper, means for adjustably positioning said slide member for controlling the flow of material through said apertures, and a rotary driven agitator assembly positioned within said hopper above said bottom portion, the improvement wherein said agitator assembly comprises a plurality of agitating elements of molded plastics material, each said agitating element including a hub portion extending axially from a radially outwardly projecting integral disc portion, said hub portion of each said agitating element having an axial length substantially greater than the axial thickness of the corresponding said disc portion, shaft means extending through said hopper and having a polygonal cross-sectional configuration, and said hub portions of said agitating elements are mounted on said shaft means in adjacent relation.

20. In a spreader for distributing a flowable material on the ground and including a hopper having opposite end walls connected by opposite side walls for receiving the material, a set of wheels supporting said hopper for ground traversing movement, a push-type handle member extending from said hopper to facilitate pushing said hopper over the ground, said hopper including a bottom portion having a series of longitudinally spaced apertures, an elongated slide member supported for sliding movement adjacent said bottom portion of said hopper, means for adjustably positioning said slide member for controlling the flow of material through said apertures, and an agitator assembly positioned within said hopper above said bottom portion, the improvement comprising means for connecting said handle member to said hopper and providing for moving said handle member relative to said hopper between a first position inclined upwardly from said hopper and a second position extending from said hopper generaly parallel to the ground, and means on the end of said handle member for selectively attaching a tow hitch and a handle grip member.

21. A spreader as defined in claim 20 wherein said handle member includes a base portion, pivot means connecting said base portion to said end walls of said hopper, said base portion being pivotable between said first position and said second position, and a clevis arranged for receiving said base portion in said generally horizontal position.

* * * * *